United States Patent [19]

Owens

[11] Patent Number: 4,547,973

[45] Date of Patent: Oct. 22, 1985

[54] TRAMMEL POINT ATTACHMENT TO STEEL TAPE RULE

[76] Inventor: Fred L. Owens, 3232 San Mateo NE., Albuquerque, N. Mex. 87110

[21] Appl. No.: 655,909

[22] Filed: Sep. 28, 1984

[51] Int. Cl.$^4$ .......................... B43L 9/04; G01B 5/00
[52] U.S. Cl. ...................................... 33/27 C; 33/158
[58] Field of Search .............. 33/27 C, 138, 158, 159, 33/160, 173

[56] References Cited

U.S. PATENT DOCUMENTS

| | | | |
|---|---|---|---|
| 1,115,390 | 10/1914 | Cady | 33/158 |
| 3,095,651 | 7/1963 | Luedicke, Jr. | 33/158 |
| 3,393,454 | 7/1968 | Creighton | 33/27 C |

FOREIGN PATENT DOCUMENTS

| | | | |
|---|---|---|---|
| 27311 | of 1909 | United Kingdom | 33/158 |
| 155970 | 1/1921 | United Kingdom | 33/158 |

*Primary Examiner*—Richard R. Stearns
*Attorney, Agent, or Firm*—Walter R. Keller

[57] ABSTRACT

A set of attachments which affix to a steel tape rule comprising a zero attachment which attaches adjacent to the zero end of the steel tape rule, and a case attachment which attaches to the case of the steel tape rule, and wherein the attachments each hold a scribing pin, commonly called trammel points, and wherein the zero attachment may additionally or in the alternatively hold a pencil or soapstone or chalk. The zero attachment affixes to the steel tape rule near the zero end of the steel tape rule, while the case attachment affixes to the case of the steel tape rule and when so attached provides for allowing the steel tape rule and the zero attachment to be extended from the case, and then the case attachment locks the steel tape rule in the extended position. Thus lofting, and measurements, as well as scribing arcs of substantial diameter are made easier and significantly faster, with no loss in accuracy.

2 Claims, 4 Drawing Figures

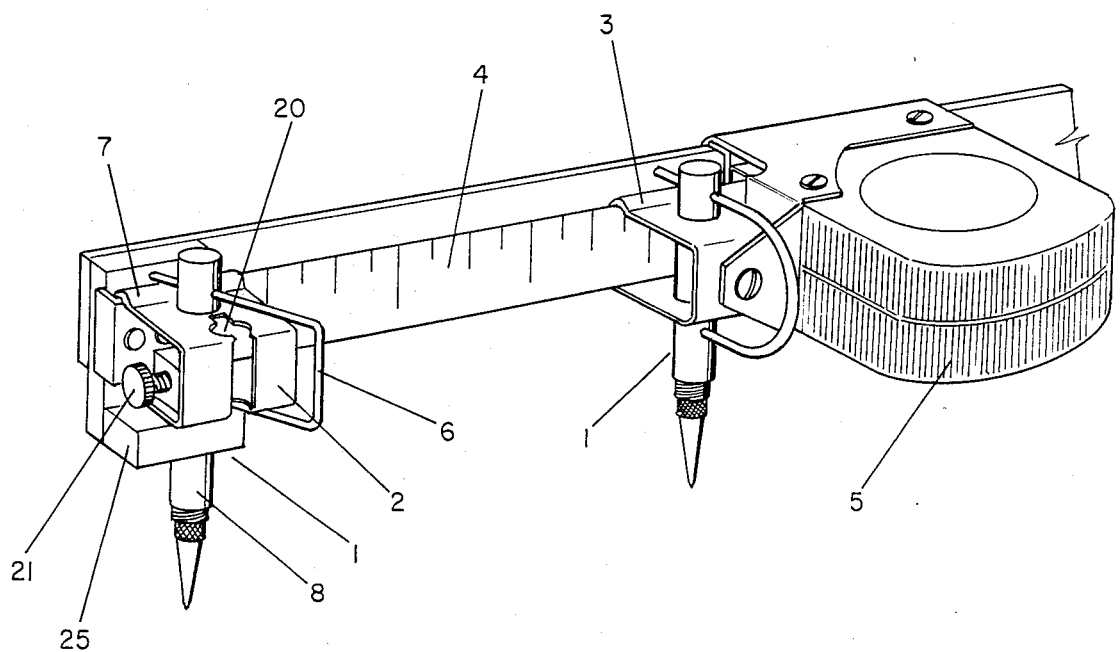
FIG—1
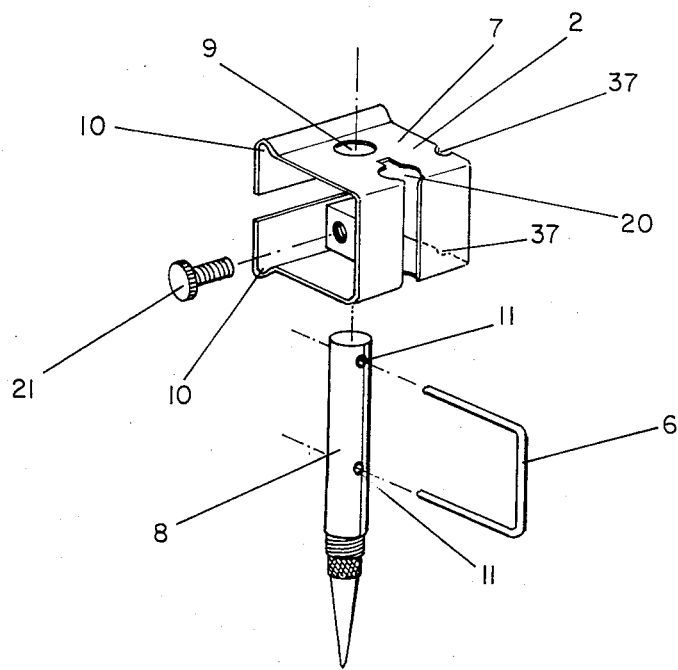
FIG—2

TRAMMEL POINT ATTACHMENT TO STEEL TAPE RULE

SUMMARY

This set of attachments for scribing pins to a steel tape rule replaces a standard trammel point bar, or trammel points which can be attached to any rigid bar or beam. It provides easy adjustment of the scribing pins when the scribing pins are used as dividers to strike a given distance from plans to metal. The set of attachments provides a quick and accurate method of adjusting the distance between the scribing pins, and a means for locking said distance to enable accurate transfer. The set, besides being a significant time saver for metal workers, can also be useful for lofting sail patterns, and for field work away from the standard shop. The set utilizes a standard steel tape rule instead of a heavy bar or beam between the points saving the usual weight and making the steel tape rule with attachments easy to carry in a pocket or tool box.

DESCRIPTION OF THE PRIOR ART

1. Field of the Invention

This invention relates to tools for metal work in general, but may have application in carpentry, and sail making as well as architecture, and cabinet making; and more specifically relates to the area of dividers, trammel points and bars.

2. Description of the Prior Art

It is very common for two trammel points to be affixed by a clamping means to a bar or beam with the distance between the points set at a predetermined distance as established on a plan or drawing, or as previously measured. In this type of device the beam and the trammel points must be moved from the plan to the work area and back and the adjusting of the trammel points on a long awkward beam is very time consuming. Another version is the extension beam type where two sliding beams with a clasp in the middle has a trammel point at the extremity of each beam. This type is still unwieldy, heavy and time consuming to adjust the central clasp. Both of the above described devices use a trammel point to scribe on sheet metal, however either could be used with a pencil, chalk, soapstone or other suitable marker.

BRIEF DESCRIPTION OF THE DRAWINGS

FIG. 1 is an isometric view of the invention attached to a steel tape rule.

FIG. 2 is an explodes isometric view of the zero attachment.

DESCRIPTION OF THE PREFERRED EMBODIMENT

Figure 3:
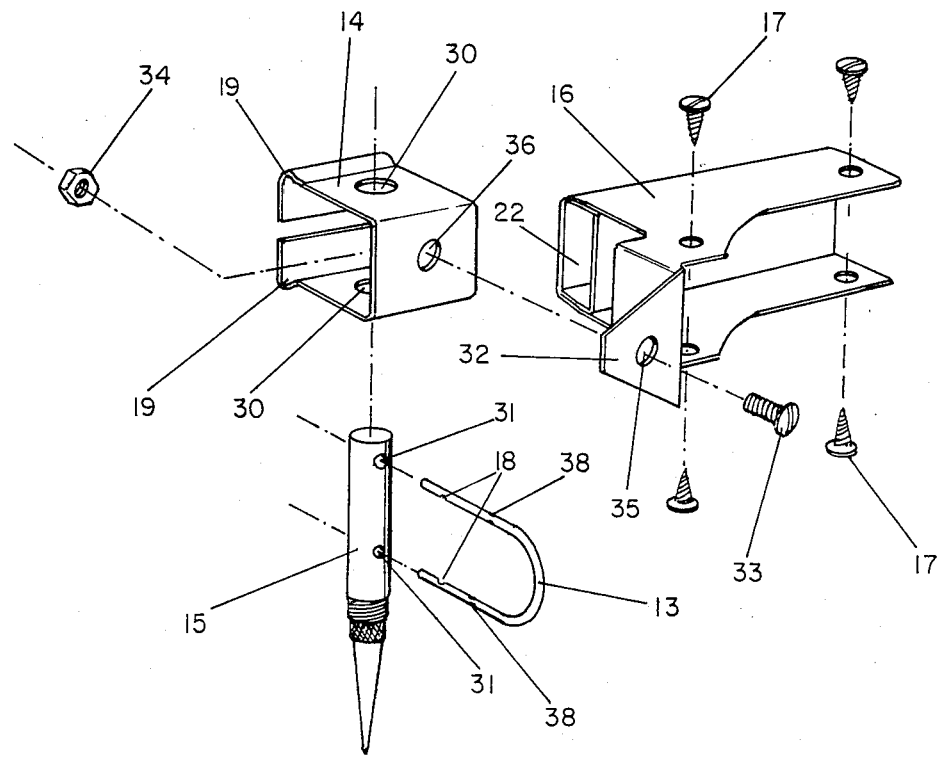
FIG. 3 is an exploded isometric view of the case attachment.
Figure 4:
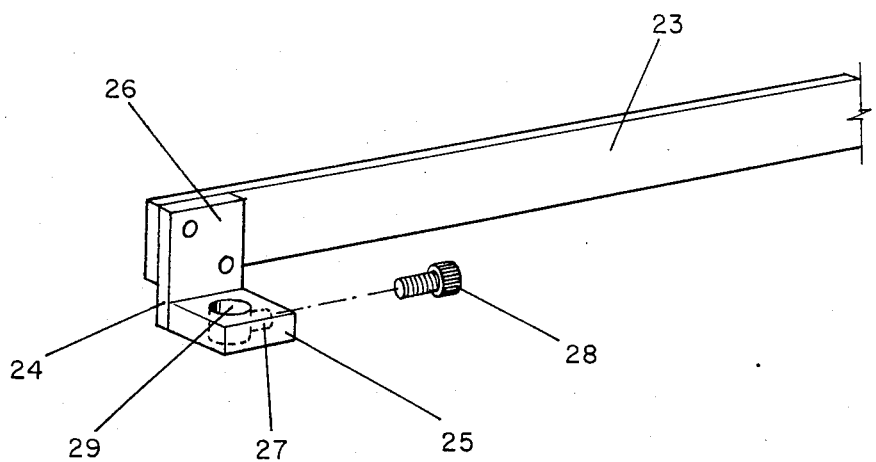
FIG. 4 is an isometric view of the slide bar.

As shown in FIG. 1, the invention comprises a set 1 of attachments, said set 1 comprising a zero attachment 2 and a case attachment 3 wherein the zero attachment 2 affixes to a steel tape rule 4 at or near the zero end of the tape 4, and the case attachment 3 affixes to a case 5 of the steel tape rule 4.

The zero attachment 2 comprises a locking arm 6, a rule clamp 7 and scribing pin 8. FIG. 2 shows the zero attachment 2 wherein the rule clamp 7 is generally channel shaped having a pin hole 9 in each leg of the channel such that the scribing pin 8 may pass through both pin holes 9. The rule clamp 7 is also shown to have the extremities of the channel, shaped to have jaws 10 into which the steel tape rule 4 may be slipped. The jaws 10 extend slightly wider than the remainder of the channel shaped rule clamp 7. The rule clamp 7 also has on each leg thereof a notch 37 placed so that when the locking arm 6 is in the locked position, the locking arm 6 is slid into the notch 37 and therein retained. The scribing pin 8 has two locking arm holes 11 spaced along the length of the scribing pin 8 so that when the scribing pin 8 is inserted into the pin holes 9, each of the locking arm holes 11 is barely on the outside of the channel. The locking arm 6 is a small U shaped rod whose U is slightly larger than the width of the rule clamp 7 but narrower than the jaws 10 and is sized to fit through the locking arm holes 11 in the scribing pin 8 and extend slightly past the jaws 10. When the locking arm 6 becomes disengaged from the jaws 10, the jaws 10 spread, and when the locking arm 6 engages the jaws 10, the jaws 10 close tightly against the steel tape rule 4.

The case attachment 3 is very similar to the zero attachment 2, in that it has a locking arm 13, rule clamp 14 with pin holes 30, jaws 19, and scribing pin 15 with locking arm holes 31. There are some differences however. The locking arm 13 has slip grooves 18 and burrs 38, and the rule clamp 14 does not have an accessory hole 20. In addition the case attachment 3 has a support channel 16 which affixes with screws 17, the case attachment 3 to the case 5 of the steel tape rule 4. The support channel 16 has a hanging tongue 32 which is rigidly affixed to the support channel 16 as by being made integral therewith or by spot welding. The hanging tongue 32 is trapezoidal shaped and attaches to the rule clamp 14 by means of a bolt 33 passing through a hanging hole 35 in the hanging tongue 32 and a bolt hole 36 in the top of the rule clamp 14 and being secured by a nut 34. The support channel 16 is shaped to slide over the case 5 and is secured thereto by a plurality of screws 17. The bolt hole 36 is centrally located in the top of the rule clamp 14.

To assemble and attach the case attachment 3, which is most conveniently attached before the zero attachment 2, the steel tape rule 4 is first slid into the support channel 16 and the support channel 16 is secured to the case 5 by screws 17. The rule clamp 14 is then placed over the steel tape rule 4, which is extending from the case 5, and is attached to the hanging tongue 32 with bolt 33 passing through the hanging hole 35 and bolt hole 36 and secured by nut 34. Next, the scribing pin 15 is inserted in the pin holes 30 and the locking arm 13 is inserted into the locking arm holes 31. When the locking arm 13 is positioned perpendicular to the steel tape rule 4, it is in contact with the trapezoidal shaped hanging tongue 32 preventing the locking arm 13 from being rotated further towards the case 5. When thus positioned, the slip grooves 18 are engaging the jaws 19 allowing the jaws 19 to spread and the steel tape rule 4 to slide within the jaws 19 for adjustment. When the locking arm 13 is rotated away from the case 5, the slip grooves 18 disengage from the jaws 19 because the burrs 38 prevent the locking arm 13 from sliding further through the locking arm holes 31; and the full thickness of the locking arm 13 engages the exterior of the jaws 19 causing the jaws 19 to clamp tightly on, and lock, the steel tape rule 4 in the desired extension.

To assemble the zero attachment 2 to the zero end of the steel tape rule 4, the steel tape rule 4 is extended a convenient working length and locked in the extended position by the case attachment 3. Next the rule clamp 7 is slid over the steel tape rule 4 so that the edges of the tape slide in the jaws 10, and the scribing pin 8 is inserted into the scribing pin holes 9. The locking arm 6 is next inserted into the locking arm holes 11. The zero attachment 2 is then slid against the zero end stop of the steel tape rule 4 and the locking arm 6 rotated until the locking arm 6 engages the exterior sides of the jaws 10, thereby clamping the jaws 10 onto the steel tape rule 4 and locking the zero attachment 2 in place. Once locked into position in the aforesaid manner, the locking arm 6 is positioned in the notches 37 and the zero attachment 2 needs no further adjustment.

With both the zero attachment 2 and the case attachment 3 affixed to the steel tape rule 4 as described in the foregoing, the case attachment 3 can be unlocked and the steel tape rule 4 adjusted to any desired length and with a flick of a finger, the case attachment 3 is locked again securing and holding the steel tape rule 4 extended in the desired length, as well as the distance between the scribing pins 8 and 15. With frequent use, and after many lockings and unlockings of the case attachment 3, the exterior of the jaws 19 may be worn by the rubbing of the locking arm 13 against the exterior surface of the jaws 19. If the jaws 19 become worn to the extent that the jaws 19 no longer lock satisfactorily when engaged by the locking arm 13, the user can disassemble the case attachment and reverse the rule clamp 14 and reassemble. In this manner a new surface on the exterior of the jaws 19 will bear against the locking arm 13 when the locking arm 13 is rotated to the locked position, and thus the life of the case attachment 3 is doubled. It is for this reason that the bolt hole 30 is centrally located on the top of the rule clamp 14. It is important, also, to understand that the distance from the zero end of the steel tape rule 4 to the scribing pin 8 is exactly the same distance as from the exposed edge of the rule clamp 14 to the scribing pin 15, so that when reading the desired measurement on the steel tape rule 4, one reads at the exposed edge of the rule clamp 14, instead of as the tape exits the case 5. Therefore the distance between the scribing pins 8 and 15 is the same as indicated by the exposed steel tape rule 4 when read as above indicated.

The rule clamp 7 has an accessory hole 20 which will accept either a pencil or a stick of soapstone. The zero attachment 2 is equiped with a set screw 21 which can secure the pencil or stick of soapstone therein.

The support channel 16 has on its bottom and adjacent and parallel to the base of the steel tape rule 4, a channel slot 22. This channel slot is sized to accept a slid bar 23 which is slideable in and out of the channel slot 22. The slide bar 23 has on one extremity an L shaped foot 24, said L shaped foot 24 having a base 25 and a stem 26. The stem 26 is affixed to the slide bar 23. The base 25 has therein an attaching hole 29 sized to slide over the scribing pin 8, and a set screw hole 27 and a set screw 28 which when threaded into the set screw hole 27 secures the slide bar 23 to the scribing pin 8. When the slide bar 23 is assembled and attached to the zero attachment 2, and slideably inserted into the channel slot 22 in the case attachment 3, the slide bar 23 provides desired rigidity to the steel tape rule 4 which can assist in making more accurate measurements and layouts, than when a mere flexible steel tape rule 4 is used.

It should be noticed that the slide bar 23 may be removed and the function of the set 1 is not affected, except that the user will have to contend with the flexibility inherent with steel tape rules 4. The length of the slide bar 23 is a matter of convenience and the slide bar 23 may in fact be sectioned to fit into a tool box.

The entire device except the scribing pins 8 and 15, commonly called trammel points, may be made of any material that has sufficient strength and rigidity. Stainless steel has been found to be very satisfactory. The scribing pins 8 and 15, because they are usually very sharp and used on hard material, are also preferrably made of steel, or even a specially hardened steel.

I claim:

1. A set of attachments comprising:

a zero attachment and a case attachment wherein the zero attachment affixes to a steel tape rule at the zero end and wherein the case attachment affixes to the case of the steel tape rule, and wherein the zero attachment further comprises a locking arm, a rule clamp, and a scribing pin, and wherein the rule clamp is generally a channel shaped member having a pin hole in each leg of the channel such that the scribing pin may pass through both pin holes, and wherein the rule clamp has jaws formed into the extremities of the channel legs into which the steel tape rule may be slipped and wherein the jaws extend slightly wider than the channel shaped rule clamp, and wherein the rule clamp has notches to accept the locking arm, and wherein the scribing pin has two locking arm holes spaced along the length of the scribing pin so that when the scribing pin is inserted into the pin holes in the rule clamp, each locking arm hole is barely outside of the channel, and wherein the locking arm is a small U shaped rod whose U is slightly larger than the width of the channel of the rule clamp and the locking arm is shaped to be slideably inserted into the locking arm holes in the scribing pin, and wherein the rule clamp has an accessory hole to accomodate an accessory such as a pencil or stick of soapstone, and wherein the rule clamp has mounted therein a set screw to secure the accessory, and wherein the free ends of the U of the locking arm extend sufficiently so that they engage the jaws when the locking arm is so positioned and do not engage the jaws when alternatively positioned, the positioning occurring when the scribing pin is rotated by means of the locking arm, and wherein the jaws, activated by the positioning of the locking arm, either clamp or release the steel tape rule, and wherein the case attachment further comprises a locking arm, a rule clamp, and a scribing pin, and wherein the rule clamp is generally a channel shaped member having a pin hole in each leg of the channel such that the scribing pin may pass through both pin holes, and wherein the rule clamp has jaws formed into the extremities of the channel legs into which the steel tape rule may be slipped and wherein the jaws extend slightly wider than the channel shaped rule clamp, and wherein the scribing pin has two locking arm holes spaced along the length of the scribing pin so that when the scribing pin is inserted into the pin holes in the rule clamp, each locking arm hole is barely outside of the channel, and wherein the locking arm is a small U shaped rod whose U is slightly larger than the width of the channel of the rule clamp and the locking arm is shaped to be slideably inserted into the locking arm holes in the scribing pin, and wherein the locking arm has on the interior of the U and adjacent to the extremities of the U, a slip groove on each leg of the U shaped locking arm, and and each leg of the locking arm has a burr which prevents the locking arm from sliding too far into the locking arm pin holes, and wherein the case attachment has a support channel, said support channel having rigidly affixed thereto a trapezoidal hanging tongue and said hanging tongue having therein a hanging hole, and said hanging tongue being affixed to the rule clamp by means of a bolt through the hanging hole and the bolt hole and secured by a nut, and said support channel being sized to mate with the case of the steel tape rule and to be secured thereto by screws, and said support channel having a channel slot which is sized to accept a slide bar and said channel slot being positioned parallel to and adjacent to the base of the case, and wherein when the locking arm is positioned approximately perpendicular to the steel tape, the slip grooves engage the exterior surface of the jaws allowing the jaws to spread and the steel tape therein to be slid and the locking arm is stopped by the trapezoidal hanging tongue from rotating further toward the case, and when the locking arm is alternatively positioned, the full thickness of the locking arm engages the jaws and causes the jaws to clamp and hold the steel tape therein.

2. The set of attachments of claim 1 having an additional member, said additional member being a slide bar, wherein the slide bar has an L shaped foot affixed at one end and said L shaped foot having a stem and a base, and wherein the stem is affixed to the slide bar and the base having therein an attaching hole into which the scribing pin of the zero attachment slides, and wherein the base has a set screw hole to accomodate a set screw which secures the base to the scribing pin in the zero attachment, and wherein the slide bar is sized to be inserted slideably into the channel slot in the case attachment.

* * * * *